April 29, 1941.   H. P. REIBER   2,240,195
CLAMPING SUPPORT
Filed April 6, 1938   3 Sheets-Sheet 1
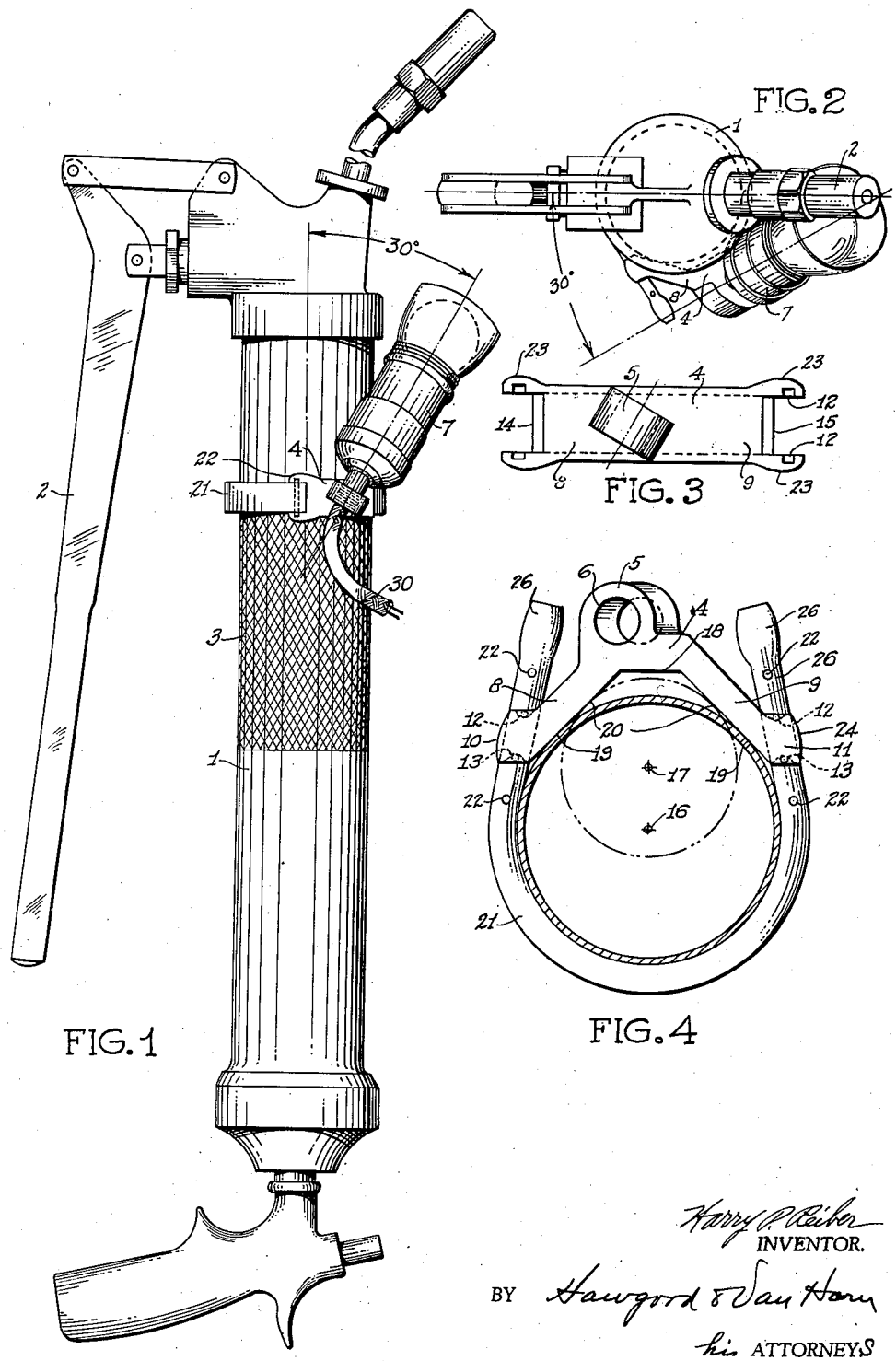

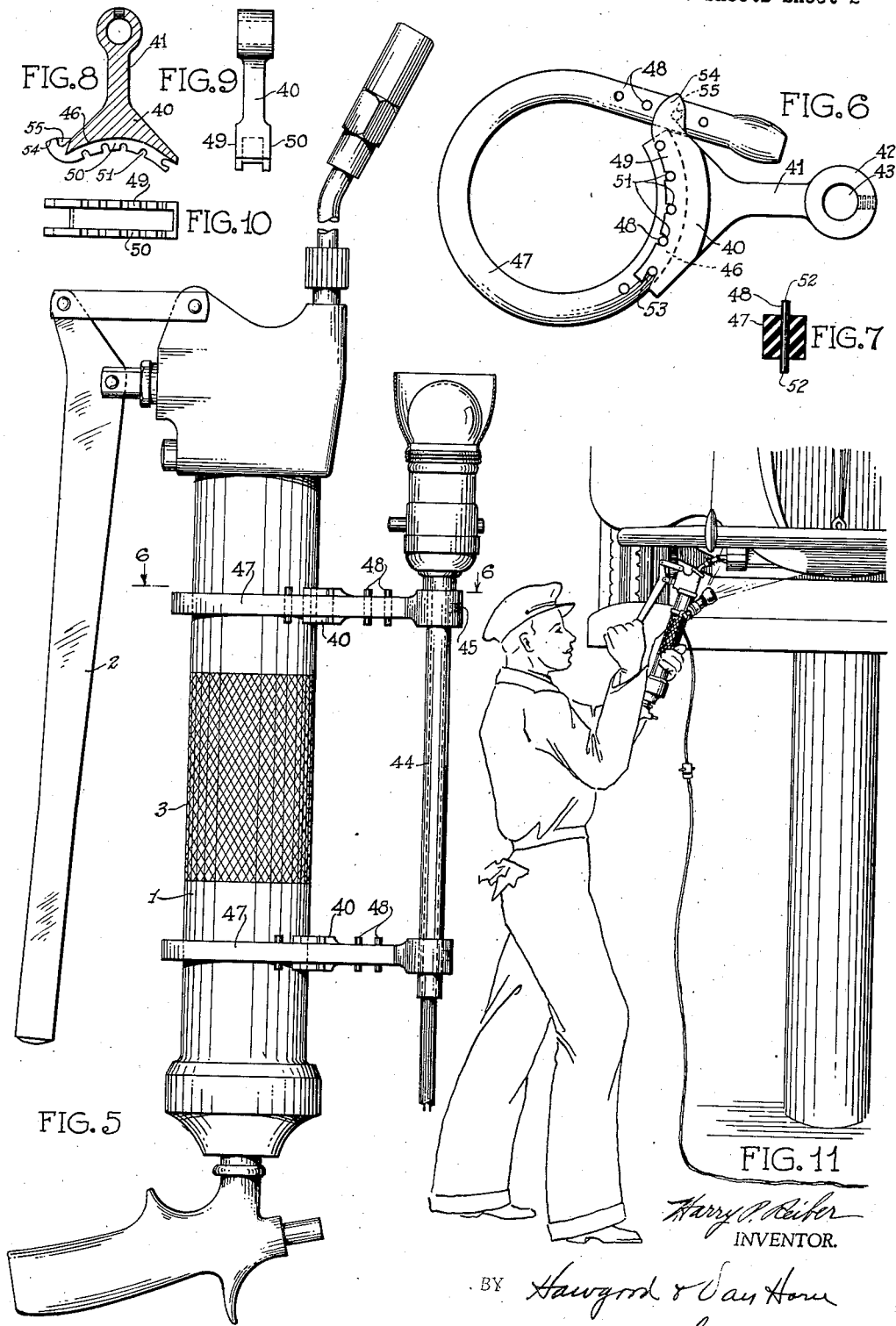

April 29, 1941.   H. P. REIBER   2,240,195
CLAMPING SUPPORT
Filed April 6, 1938   3 Sheets-Sheet 3

Harry P. Reiber
INVENTOR.
BY Hawgood & Van Horn
His ATTORNEYS

Patented Apr. 29, 1941

2,240,195

UNITED STATES PATENT OFFICE 2,240,195

CLAMPING SUPPORT

Harry P. Reiber, Pittsburgh, Pa.

Application April 6, 1938, Serial No. 200,492

2 Claims. (Cl. 24—256)

My invention is an improvement in supports and relates more particularly to a clamping support such, for instance, for attaching an illuminating means to another object.

While my invention is capable of many applications and uses, one application may be used as an illustration of the invention, and to this extent I have shown in the drawings the invention applied to a lubricating gun or similar article.

I am aware that electric lamps have heretofore been attached to lubricating devices such as, for instance, those shown in Letters Patent Numbers 1,165,511 and 1,924,150, and I do not here intend to claim as my invention the broad combination with such a device of an illuminating means.

At the present time lubrication of an automobile chassis is accomplished by the use of various types of pumps, force guns, and special nozzles, and in many instances I have found that because of the lack of proper illumination upon the fitting to which the pump or gun is applied, proper and efficient lubrication of that part is extremely difficult and often times incomplete because of loss of lubricant through an improper contact between the gun nozzle and fitting.

Also, when fittings are obscured by mud and other foreign matter caked thereon, and due to the usual poor visibility of parts and fittings, it is extremely difficult to properly use a grease gun or the like without proper illumination.

While attempts have been made heretofore to correct these conditions, I have found that the provision of means for quickly attaching a light to a gun or other object in an effective manner has presented a difficult problem. This is particularly true where the gun or object to which the light is attached is of odd or irregular shape.

It is, therefore, one of the objects of my invention to overcome the difficulties heretofore experienced and to provide a support for attaching a source of illumination to an article such as a lubricating gun whereby the lamp may be readily and quickly attached and detached from the gun barrel.

It is another object of my invention to provide an attaching means of this type which due to its construction affords extreme ease of operation in use, and at the same time provides a very rigid structure.

A further object of the invention consists in means for attaching a light to another object which performs a definite function at one end thereof in such a manner that the beam of light will be directed toward the point where the function is to be performed.

A still further object of my invention is to provide a device of this nature which, by its construction, is readily attachable to any one of a plurality of members of varying cylindrical cross-section.

Another object of the invention resides in providing a device of the class mentioned which comprises a rigid member and an elastic flexible attaching means detachably carried by the rigid member.

It is still further object of my invention to provide a device which is compact and extremely inexpensive to manufacture.

Another object of the invention is to provide a device of the character described which requires no tools or accessories to apply the same to an object or to lock the same in position.

Other objects and advantages of my invention will become more apparent from the following description of several embodiments thereof, reference being had to the drawings in which like parts are designated by like reference characters throughout.

In the drawings:

Figure 1 is a side elevation of a lubricating gun showing my invention applied in use;

Figure 2 is an end view of a structure shown in Figure 1 and is taken from the nozzle end looking rearwardly;

Figure 3 is a top plan view of the rigid member forming a part of my invention;

Figure 4 is a side view of the same and illustrates the adaptability of this member to cylindrical position of different diameters;

Figure 5 is a side elevation of a second form of my invention in which the electric lamp and the conduit supporting the electric conductors to the lamp are spaced from the body of the lubricating gun at a plurality of points;

Figure 6 is a view of the clamping means taken on line 6—6 in Figure 5;

Figure 7 is a sectional view taken on line 7—7 of Figure 6;

Figure 12:
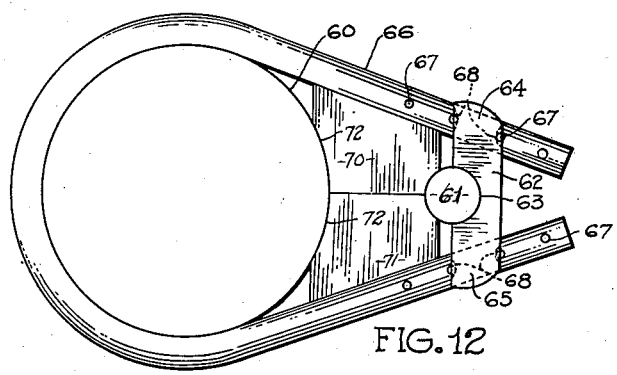
Figure 13:
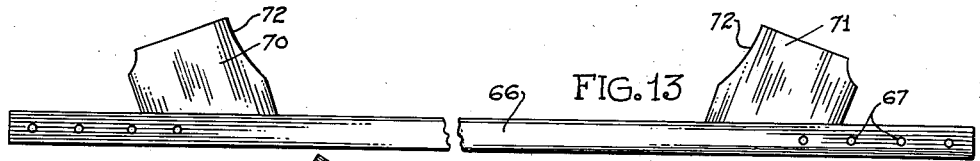
Figure 14:
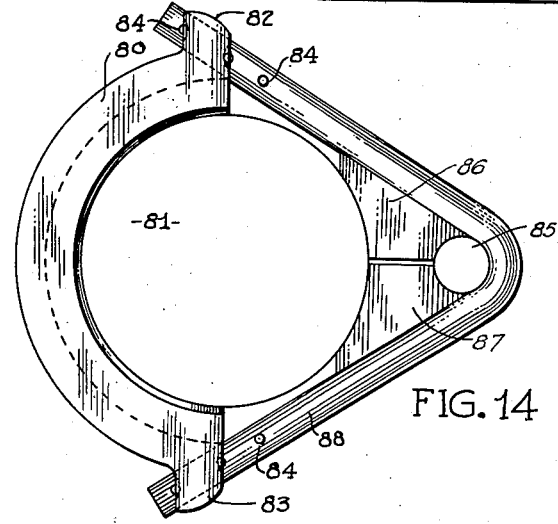
Figure 15:
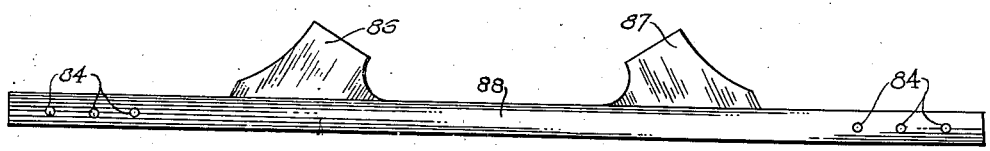

Figures 8, 9, and 10 are detail side, end, and bottom views of the rigid members shown in Figure 6;

Figure 11 illustrates the manner in which the invention illustrated in Figures 1 to 4 is applied in actual use;

Figure 12 is another modification of my invention and illustrates the device in side elevation;

Figure 13 is a detailed view of the elastic flexible band of Figure 12 shown in uncoiled position;

Figure 14 illustrates another modification of my invention which is similar in many respects to that shown in Figures 12 and 13, but it differs in other respects as will be more fully pointed out hereinafter, and Figure 15 is a view of the uncoiled flexible band shown in Figure 14.

It will be understood from the description of my invention that the same in its several forms is equally applicable to uses other than to that which is illustrated in the accompanying drawings, and which is described herein, and I do not limit the invention to the particular details disclosed or to the specific application herein shown.

I will describe first the embodiment of my invention illustrated in Figures 1 to 4 and in Figure 11, in which the invention is shown applied to a hand gun type of lubricator.

Figure 5 shows the second embodiment of this invention also applied to the same type lubricator.

It is to be understood however, that while the invention is shown in the drawings as applied to this type of lubricator, the same may be applied to other types such as power gun and even lubricant dispensers of the portable type.

Referring now more particularly to Figures 1 to 4 and to Figure 11, the hand gun type of lubricator comprises a barrel 1 which has a dispensing nozzle 2 and a lever operated mechanism for feeding the lubricant from the barrel through the nozzle. The barrel usually is provided with a knurled section 3 which is located intermediate the ends of the barrel to provide a hand grip for the operator. As is usual with this and other types of lubricators, the nozzle 2 is so disposed with relation to the barrel that the axes of the two members intersect at an angle of about thirty to forty degrees for convenience of handling and operating.

In carrying out my invention I have provided a nozzle support and clamping means for quickly and easily attaching and detaching an electric lamp to the gun barrel.

As illustrated in the above figures, the present embodiment of my invention includes a member preferably rigid and formed of metal which may be cast to form by suitable dies or by moulding.

This member 4 is provided with suitable means for securely attaching thereto an electric lamp socket and is further provided with means for carrying a clamping member which is preferably in the form of an elastic, flexible band, adapted to grip the barrel of the lubricator gun to provide a rigid connection and support for the electric light. More specifically, this embodiment of my invention includes a rigid member 4 which is shown in more detail in Figure 4 to comprise a projection 5, having an opening 6 therein, by which a lamp socket 7 may be attached and held securely within the projection 5.

In viewing the rigid member 4 as shown in Figure 4, the same includes downwardly extending and diverging arms or posts 8 and 9 which terminate at their free ends in outwardly extending enlarged or headed portions 10 and 11.

Each of the outwardly extending enlarged portions is provided with opposed upper and lower pin receiving recesses 12 and 13 respectively. Each of the opposed recesses is in alignment with one another as shown more clearly in Figure 3, the respective outwardly projecting portions of the posts 8 and 9 being bifurcated at 14 and 15 to provide suitable opening through which the elastic flexible clamping member may extend.

It is to be noted from Figure 4 that the inner opposite walls of the downwardly diverging arms 8 and 9 are disposed at such an angle to each other so that the seating of the rigid member on a tubular gun barrel of pre-determined radii, varying, for example, between the centers 16 and 17, will at all times provide a space between the outer cylindrical wall of the gun barrel and the upper wall 18 of the member 4, there being provided but two opposed bearing surfaces between the gun barrel and the diverging arms 8 and 9 at the approximate points 19 for the center 16 at points 20 for the center 17.

In this manner I have provided a structure which can be seated firmly against the outer walls of the gun barrel when the elastic band is taken up to clamp the rigid member on the barrel. Side swing of the member is thus eliminated.

The elastic flexible band is illustrated at 21 and in this embodiment of my invention comprises a length of live rubber which may be of rectangular cross-section and which is provided along its end portions with a series of transversely spaced pins 22 extending through the thickness of the band in a lateral direction and extending at their ends beyond the side walls of the rubber strip. It is to be noted that the center to center distance between adjacent pins of each series is normally less than the center to center distance of the adjacent pins which are engaged in the sockets of the respective enlarged end portions of the arms 8 and 9. This is due to the spaced relationship between the upper and lower sockets or seats 12 and 13, which is sufficiently great to cause the pins seated therein to be placed under tension of the rubber strip to more firmly seat and retain them in their respective sockets.

The series of pins along the ends of the rubber strip is provided for the purpose of securing a selection of adjustments in tightening the band around the gun barrel, and by virtue of this arrangement any two adjacent pins of a series may be seated in the respective upper and lower sockets 12 and 13 of the respective enlarged outwardly extending section of one of the arms.

Referring more particularly to Figure 3 it will be noted that the ends of the pins seat snugly with the sockets 12 and 13 and that the operator is protected from the ends of the pins by means of the enlarged portions 23 closing the recesses or sockets to the outside.

The outward contour of the enlarged portions of the arms 8 and 9 is rounded or slightly pointed at 24 so as to increase the ease with which the adjacent pins of a series may be guided into the respective recesses 12 and 13.

The axis of the opening 6 in the projection 5 is preferably disposed at an angle of about thirty degrees to the axis of the gun barrel to which the device is attached and in this manner enables the mounting of the light socket to be so disposed whereby the beam of light is directed in the proper direction for efficient illumination of the fitting which is to be contacted by the nozzle 2.

From the above it will readily be seen that this device is extremely simple of construction and is very easy to operate and use.

In applying the light support to the gun barrel one end of the elastic strip is secured to one of the arms 8 or 9 in the manner illustrated in Figure 4 by slipping adjacent pins 22 over the enlarged end of the arm 8 so that the extending ends of the respective pins will be seated in the recesses 12 and 13. The elastic band is then slipped around the circumference of the gun barrel, and is drawn tightly by the operator gripping the opposite end at 26 with the thumb and finger, and pulling upwardly to stretch the band tightly around the gun barrel, at the same time extending the center to center distance between the adjacent pins which are to be seated in the seats or recesses 12 and 13 of the enlarged portion 11 of the arm 9.

These pins are then slipped around the enlarged end and are snapped into place at the respective seats as indicated in the drawings, and the device is thereby readily and securely attached to the gun barrel. It will be noted from Figure 1, that the axis of the light socket is by virtue of the construction of the rigid member disposed in an axial line which is approximately thirty degrees to the longitudinal axis of the gun barrel.

Of course, in thus assembling the device the operator is careful to position the band circumferentially with respect to the gun barrel so that the beam of light will fall on the area to be operated upon by the nozzle 2.

To detach the device from the gun barrel it is merely necessary to grip one of the ends of the elastic band and by pulling upwardly on the same as shown in Figure 4, the seated pins will be further spaced apart and the upper one may be slipped over the enlarged end of the adjacent arm of the rigid member and the band then easily removed from the gun barrel.

The above described embodiment of my invention is preferred by me because it employs only one clamping band for the light support and is therefore quite inexpensive to manufacture and apply. Furthermore, the electric conductors 30 are free to assume a position removed from the gun barrel throughout the length thereof, except for the part entering the socket. This provides for more freedom of operation and permits the operator's hand to firmly grip the knurled portion of the barrel at 3 without interference. It is found desirable to equip the socket 7 with a length of conductor cable which is preferably longer than the gun barrel and to provide at its free end a coupling or cord connector to a longer piece of conductor cable. This is indicated in Figure 11.

In Figures 5 to 10 inclusive I have illustrated a second form of my invention in which the electric lamp socket is detachably supported on the gun barrel by means of a plurality of elastic clamping bands and in such a manner that the longitudinal axis of the socket, and therefore the light beam is substantially parallel to that of the gun barrel 1.

In this form of my invention each clamping support may include a rigid member 40 comprising an outwardly extending post portion 41 terminating in a head 42 which is open at 43 to receive a metal or other conductor tube 44. A set screw 45 is provided to fix the tube in the opening 43. The member 40 also includes a base portion which is arcuate in shape to conform generally to the contour of the gun barrel 1. In cross section the base portion is channelled as at 46, Figures 9 and 10, to receive an end of an elastic flexible clamping band 47. As in the previously described embodiment, this band is preferably made of live rubber and is provided in the region of each of its end portions with a series of pins 48 embedded therein and transversely thereof as indicated in Figure 7.

The side walls 49 and 50 of the arcuate base 40 are notched at regularly spaced intervals at 51 to receive the extending ends 52 of the pins 48. One end of the arcuate base is slotted at 53 and the slot is inclined to more readily receive and retain the pin 48 which engages it as in Figure 6. Thus, as some of the pins 48 are engaged in the notches 51 and another is seated in the inclined slot 53, this end of the elastic band will be firmly secured and anchored to the arcuate base. To increase the effectiveness of the connection between the base and the band end I prefer to make the normal distance between centers of the adjacent pins in the series less than the distance between the centers of the notches in the bottom of the arcuate base. In this manner the band must be stretched to properly seat the pins in the respective notches.

The opposite end of the arcuate base is formed into a hooked or upturned end as at 54. This end is, of course, bifurcated to receive the opposite end portion of the band as illustrated in Figure 6 so that one of the pins 48 can be seated in the recess 55 after the band has been stretched or drawn tightly around the circumference of the gun barrel as illustrated.

The structure of each of the supports 40 may be substantially the same and the same may be clamped by similar means to the gun barrel in the manner just described. In this way the lamp socket is supported at one end of a tube or conduit 44 at a point close to the nozzle end of the gun to direct the beam of light to the area being served by the nozzle, while the other end of the conduit 44 is supported at the rear end of the gun. It will be noted that the conduit 44 is spaced at a sufficient distance from the gun barrel to permit the operator to grasp the barrel at the knurled portion 3.

While I have shown in this embodiment means for clamping a lamp socket and conduit in spaced parallel relation to the gun barrel, my invention also contemplates the use of a self contained electric light with battery connected to the gun barrel in substantially the same manner.

In Figures 12 and 13 I have illustrated a third form of the invention which is particularly adapted for small bore lubricator fittings such as those used with portable lubricant dispensers. In this embodiment the outer circumference of a light socket is indicated at 60 and the small bore lubricator fitting is indicated at 61.

A rigid member 62 is formed to snugly fit the fitting as at 63 and extends on opposite sides thereof as at 64 and 65 to form supporting arms to which an elastic flexible clamping band 66 of live rubber is detachably secured.

As in the previous embodiments, the elastic band 66 is provided with a series of transverse pins 67 embedded therein and adapted to be selectively seated in the depressions 68 of the rigid member by stretching the band and slipping the pins over the headed portions 64 and 65.

In this embodiment I provide a filler comprising blocks 70 and 71 preferably formed integral with the band 66 near the ends thereof as shown in Figure 13. These blocks provide a cushion in the space between the nozzle 61 and the lamp socket 60 and serve to properly space the same at all times. Each of the blocks is curved at 72 to fit the circumference of the lamp socket 60 when the band encircles the same as shown in Figure 12.

In Figures 14 and 15 I have shown a slightly different embodiment to that just described. The present form is adapted to be used where it is desirable to seat the rigid member 80 to the lamp socket 81. The rigid member is approximately semi-circular in cross-section and closely conforms to the circumference of the socket 81 as shown. At the extremities of the member are provided outwardly projecting arms 82 and 83 to which the end portions of the elastic band are removably attached as shown in Figure 14 by means of the pins 84, this band passing around the fitting 85 at its intermediate portion.

As in the embodiment shown in Figure 12, I also provide in the present form a filler to provide a spacing cushion between the socket and the fitting. This filler may consist of the blocks 86 and 87 carried by the band 88 and shaped to substantially fill the space between the socket and the fitting.

From the foregoing descriptions of the several embodiments of my invention it will be seen that I have provided a simple, inexpensive structure which is particularly useful with lubricator fittings to project a beam of light which may be fixed relative to the nozzle of the lubricator in such a manner that the area to be served by the nozzle will be brightly illuminated and therefore be rendered more easily accessible.

My invention is intended for, and is capable of, many other applications in use, and by means of the flexible elastic attaching band, the same may be applied effectively to many different objects of various shapes without departing materially from the simplicity of its construction as herein described.

Various changes in the details of construction and arrangement of parts may be made without departing from the spirit of my invention or the scope of the appended claims.

I claim:

1. In a device of the class described a member having outwardly extending arms, and an elastic band for embracing an object, said band having a series of spaced transverse pins adjacent its ends for selective seating in the recesses of the respective ends of said member when the band embraces an object at its intermediate portion, the center to center distances between said pins of each series being less than the distance between the adjacent recesses in the arms of said member when the band is not under tension, the space between said pins being increased when the end portions of the band are under tension to thereby permit adjacent pins of a series to easily enter the respective adjacent recesses of the arms.

2. In a device of the class described a member having a channelled base portion and an outwardly extending socket supporting portion, the channelled base of the said member having a series of aligned slots in the side walls defining the channel, and an elastic band for embracing an object, said band having a portion adapted to lie in said channelled base and having locking pins therein for engagement in the slots of the aligned series when the band is under tension, an end of said band having detachable engagement with another portion of said member base.

HARRY P. REIBER.